United States Patent
Asada

(10) Patent No.: US 6,462,517 B2
(45) Date of Patent: Oct. 8, 2002

(54) VOLTAGE REGULATOR OF VEHICLE AC GENERATOR

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/922,691

(22) Filed: Aug. 7, 2001

(65) Prior Publication Data
US 2002/0014881 A1 Feb. 7, 2002

(30) Foreign Application Priority Data
Aug. 7, 2000 (JP) ........................ 2000-238627

(51) Int. Cl.$^7$ ................................. H02H 7/06
(52) U.S. Cl. ........................ 322/28; 320/123
(58) Field of Search ................. 320/123, 136, 320/148; 322/17, 28; 307/10.1

(56) References Cited

U.S. PATENT DOCUMENTS

| 4,361,796 A | * | 11/1982 | Akita et al. .................. 322/99 |
| 4,583,036 A | | 4/1986 | Morishita et al. |
| 4,831,322 A | | 5/1989 | Mashino et al. |
| 4,985,670 A | * | 1/1991 | Kaneyuki et al. .............. 322/28 |
| 5,994,787 A | * | 11/1999 | Hibino ....................... 307/10.1 |
| 6,060,866 A | * | 5/2000 | Sada et al. .................... 322/59 |
| 6,271,649 B1 | * | 8/2001 | Iwatani ........................ 322/29 |
| 6,344,734 B1 | * | 2/2002 | Iwatani et al. ................. 322/28 |

FOREIGN PATENT DOCUMENTS

| JP | A-63-77333 | 4/1988 |
| JP | 1055021 | 3/1989 |
| JP | 2276500 | 11/1990 |

* cited by examiner

Primary Examiner—Adolf Deneke Berhane
(74) Attorney, Agent, or Firm—Oliff & Berridge, PLC

(57) ABSTRACT

A voltage regulator of a vehicle AC generator includes a switching element connected between a battery and a field coil, a control circuit for controlling the switching element according to battery voltage, a power circuit for supplying the control circuit with a constant voltage and a reverse-current blocking diode having an anode connected through an outside power line to the battery and a cathode connected to the power circuit. Even if a large negative surge voltage is generated in a power line connected to a battery, and applied to the power circuit, the output voltage, i.e. $V_{DD}$, does not widely fluctuate, so that devices included in the voltage regulator, such as a comparator or an oscillator, can operate properly.

7 Claims, 4 Drawing Sheets

VOLTAGE REGULATOR OF VEHICLE AC GENERATOR

CROSS REFERENCE TO RELATED APPLICATION

The present application is based on and claims priority from Japanese Patent Application 2000-238627, filed Aug. 7, 2000, the contents of which are incorporated herein by reference.

BACKGROUND OF THE INVENTION

1. Field of the Invention

The present invention relates to a voltage regulator of a vehicle AC generator and, particularly. a voltage regulator having a semiconductor switch element for controlling field current to be supplied to a field coil of a vehicle AC generator.

2. Description of the Related Art

A recent voltage regulator of a vehicle AC generator is provided with various electronic circuits, such as a comparator, an operational amplifier, an oscillating circuit and/or the like, disposed in an IC chip. A constant voltage power circuit is also provided in order to supply constant voltage power to such circuits.

On the other hand, a number of electro-magnetic actuators have been mounted in a vehicle. If two or more electro-magnetic actuators are turned off concurrently, a large negative surge voltage, such as shown in FIG. 7, is generated in a power line connected to a battery, and the negative surge voltage may be applied to a high-side terminal of the constant voltage circuit. In such a case, the output voltage, i.e. $V_{DD}$, widely fluctuates, resulting in that the comparator and the oscillator can not operate properly.

SUMMARY OF THE INVENTION

Therefore, a main object of the invention is to provide an improved voltage regulator that is free from the above stated problems.

According to a main feature of the invention a voltage regulator of a vehicle AC generator includes a switching element connected between a battery and a field coil, a control circuit for controlling the switching element according to terminal voltage of the battery, a power circuit for providing a constant voltage from power supplied thereto and supplying the control circuit with the constant voltage and a reverse-current blocking diode having an anode connected through an outside power line to the battery and a cathode connected to the power circuit. Even if a large negative surge voltage is generated in a power line connected to a battery and applied to the power circuit, the output voltage, i.e. $V_{DD}$, does not widely fluctuate, so that devices included in the voltage regulator, such as a comparator or an oscillator, can operate properly.

Preferably, a portion of the control circuit, the power circuit and the reverse-current blocking diode are integrated into an IC chip and separated by insulation layers. However, the reverse-current blocking diode may be formed at a portion separate from the IC chip. The IC chip and the portion at which the reverse-current blocking diode is formed may be disposed in a hybrid IC unit.

It is also preferable that the reverse-current blocking diode is fixed to a first conductive support plate and the power circuit is fixed to a second conductive support plate, and that the first and second conductive support plates are thermally and electrically insulated from each other.

Further, each of the first and second support plates may be comprised of one of leads of a lead frame, the reverse-current blocking diode may have a cathode electrode connected to the power circuit by a bonding wire, and the reverse-current blocking diode, the power circuit and the bonding wires are molded together with resin.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A voltage regulator of a vehicle AC generator according to a preferred embodiment of the invention is described with reference to FIGS. 1 and 2.

Figure 1:
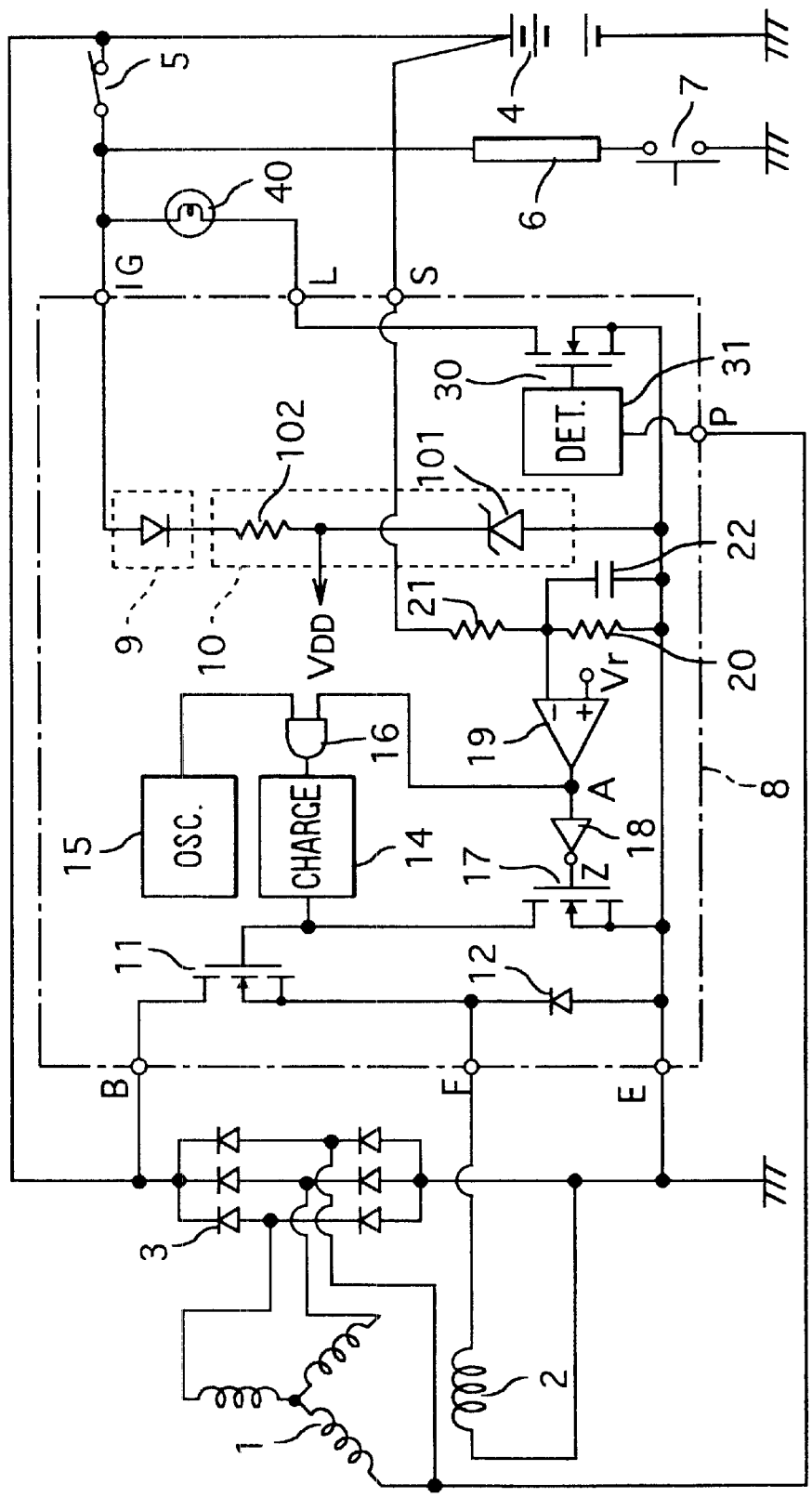
FIG. 1 is a circuit diagram of a voltage regulator of a vehicle AC generator according to a preferred embodiment of the invention.
Figure 2:
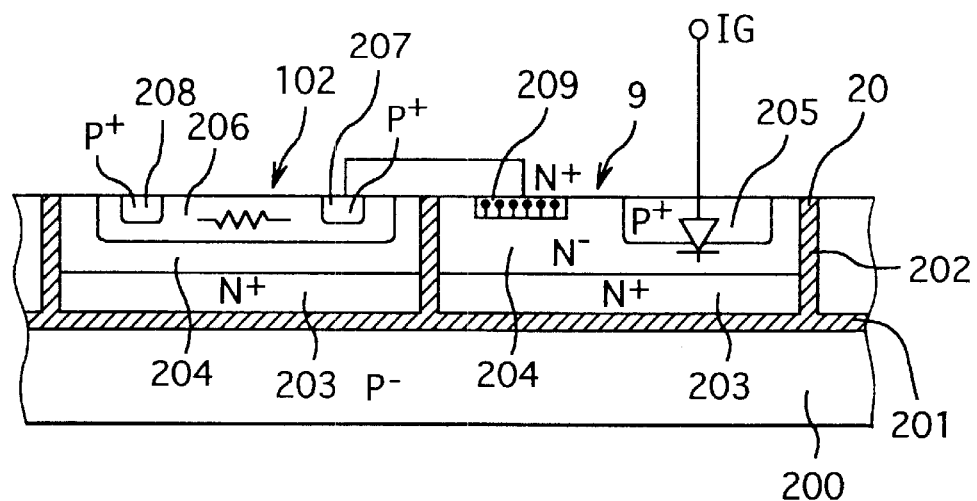
FIG. 2 is a schematic cross-sectional view of a control circuit shown in FIG. 1.

In FIG. 1, an AC generator includes a stator having a stator coil 1 and a rotor having a field coil 2. When the rotor rotates, AC power is generated in the stator coil 1. The AC power is rectified by a rectifier circuit 3 so that DC power is supplied to a battery 4 and an electric load 6. Field current to be supplied to the field coil 2 is controlled by a control circuit 8.

The control circuit 8 has a switching element 11 for controlling the field current supplied to the field coil 2. The switching element 11 is a source-follower type N-channel MOSFET that has a base and a gate. The switching element 11 controls the field current according to the voltage level applied to the base thereof Reference numeral 12 is a flywheel diode connected in parallel with the field coil 2. The gate of the switching element 11 is charged by a charge pump circuit 14 until the voltage level of the gate becomes as high as a prescribed level and is discharged by a gate-discharging transistor 17.

Terminal voltage of the battery 4 is applied to the control circuit 8 via a battery connection terminal S and is divided by resistors 20 and 21. The divided voltage is applied to a low-side terminal of a comparator 19. A capacitor 22 is connected to the low-side terminal of the comparator 19 to bypass ripple components of the battery voltage.

The divided voltage is compared by the comparator 19 with a reference voltage Vr. If the battery voltage is lower than a prescribed voltage level, the comparator 19 provides an AND circuit 16 and an inverter 18 with a Hi-level signal. Consequently, the inverter 18 turns off the gate-discharging transistor 17 to stop discharging the electric charge from the gate of the switching element 11. At the same time, the AND circuit 16 applies an output signal of an oscillation circuit 15 to drive the charge-pump circuit 14, which charges the gate of the switching element 11 to boost the voltage of the gate to a prescribed voltage level, thereby, to turn on the switching element 11. As a result, the field current is increased, and the output power of the AC generator is increased.

If the battery voltage is higher than the prescribed voltage level, the charge-pump circuit 14 stops charging the gate of the switching element 11. At the same time, the inverter 18 turns on the gate-discharging transistor 17 to turn off the switching element 11. As a result the field current is reduced and the output power of the AC generator is reduced. Thus, the battery voltage is controlled at a level decided by the reference voltage and the voltage divided by the resistors 20 and 21.

Operation of the voltage regulator is described below.

Even if a key switch 5 is turned on while the engine stops the AC voltage is not generated as the AC generator. Therefore, a generation detecting circuit 31, which detects a phase voltage of a phase-coil, turns on a switching element 30 to drive a warning lamp 40. If the engine starts and the AC generator starts generation, the generation detecting circuit 31 detects the phase voltage and turns off the switching element 30, thereby turning off the warning lamp 40. The warning lamp 40 can be driven by another signal applied to one of other devices.

A power circuit 10 is a series circuit of a constant voltage diode 101 and a current limiting element or resistor 102. The power circuit 10 is energized by the battery 4 via the diode 9 and the key switch 5 to supply various portions of the control circuit 8 with the constant voltage $V_{DD}$.

If the electric load 6 is an inductive load, the electric load 6 generates a negative surge voltage which temporarily lowers the potential of the IG terminal. The reverse-current blocking diode 9 prevents the negative surge voltage from being applied to the power circuit 10.

The reverse-current blocking diode 9 is formed at an electrical isolation type integrated circuit that is comprised of other circuits including the current-limiting resistor 102. The reverse-current blocking diode 9 and other circuits are separated by insulation layers. Reference numeral 200 indicates a low-density P-type base plate, reference numerals 201, 202 indicate oxidized layers forming a plurality of insulated N-type island regions on the base plate 200. High-density N-type layers are respectively formed at the bottom of the island regions. Low-density N-type epitaxial embedded layers are also formed on the high-density N-type layers. P-type anode regions 205, P-type resistor regions 206, high-density P-type contact region 207 and 208, and high-density N-type contact regions 209 are also formed one after another, as shown in FIG. 2. The reverse current-blocking diode 9 is formed at the right island region, and the current-limiting resistor 102 is formed at the left island region in FIG. 2. Thus, the reverse-current blocking diode 9 and other circuits are integrated into one chip, so that the voltage regulator can be made compact.

Figure 3:
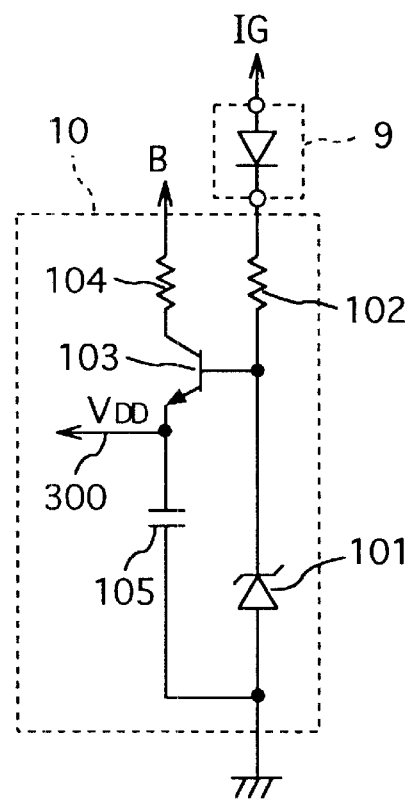
FIG. 3 is a circuit diagram of a variation of a power circuit shown in FIG. 1.

A variation of the power circuit 10 is described with reference to FIG. 3, in which reference numeral 105 represents a parallel capacitor, reference numeral 103 represents an emmitter-follower transistor and reference numeral 104 is a collector resistor. The parallel capacitor 105 controls fluctuation of the potential of an internal power line 300.

Figure 4:
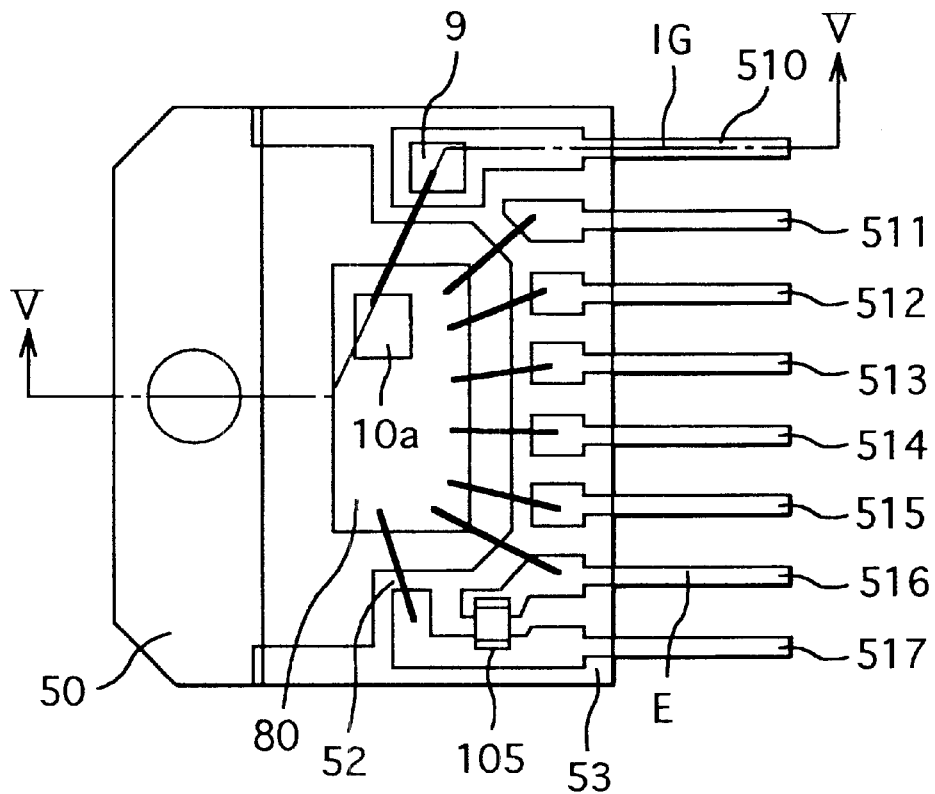
FIG. 4 is a plan view of a variation of the control circuit shown in FIG. 1.
Figure 5:
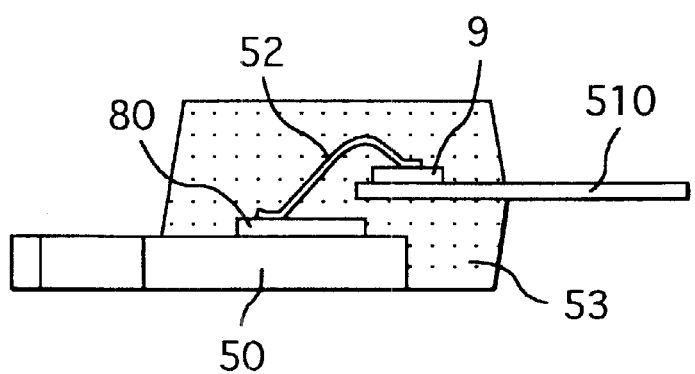
FIG. 5 is a schematic cross-sectional side view cut along line A—A in FIG. 4.
Figure 6:
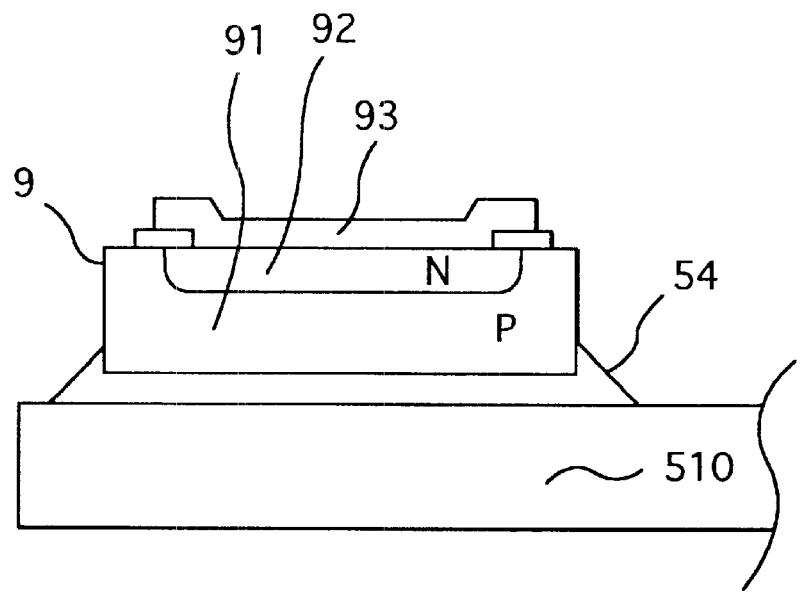
FIG. 6 is an enlarged schematic cross-sectional view of a reverse-current blocking diode.
Figure 7:
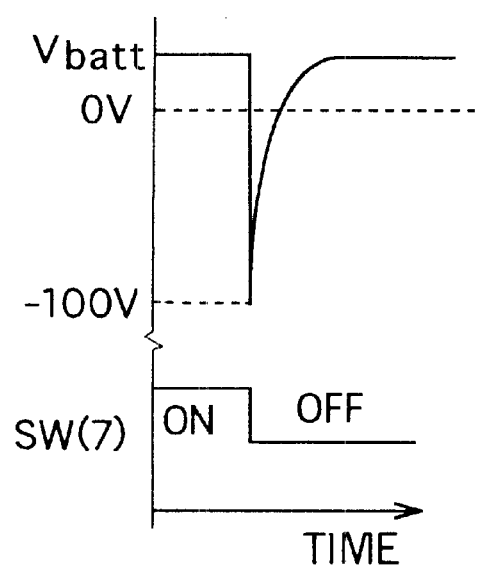
FIG. 7 is a wave form of a negative surge voltage.

A variation of the control circuit 8 is described with reference to FIGS. 4–6.

The reverse-current blocking diode 9 is fixed to a lead 510 of a lead frame. As shown in FIG. 6. the reverse-current blocking diode 9 is formed on a P-type base plate 91 to provide a PN junction by N-type diffusion.

Reference numeral 50 is a heat sink, reference numeral 52 indicates a bonding wire, numeral 53 indicates a mold member, numeral 54 is a conductive member, numeral 105 is a chip capacitor, and numerals 510–517 respectively indicate leads. Reference numeral 80 is an IC chip on which the control circuit is formed, and numeral 10*a* is a portion on which the power circuit 10 is formed. The IC chip 80 is fixed to the heat sink. The reverse-current blocking diode 9 is comprised of a P-type base plate 91, an N-type region 92 formed on the base plate 91 and a metal electrode 93 fixed to the N-type region 92. The chip of the reverse-current blocking diode 9 is fixed to the lead 510.

The metal electrode 93 is made of the same material as the bonding wires 52 to prevent the metal electrode 93 from chemically combining with the bonding wires 52. It is also preferable to use the same material for members connecting the IC chip 80 with the heat sink as the material for the conductive member 54. The chip capacitor used for the parallel capacitor 105 is disposed between a lead 516 and a lead 517. The member for connecting the capacitor 105 is made of the same material as the connecting member for the reverse-current blocking diode 9. However, it is not necessary to concurrently fix the capacitor 105 when the reverse-current blocking diode 9 is fixed. This arrangement prevents deterioration due to metal junction. If the voltage regulator is abnormally heated by the AC generator by accident, all the connecting members may be melted and disconnect the elements of the control circuit 8. Therefore, current is not supplied to the power circuit of the regulator, so that a highly safe voltage regulator can be provided.

All the above members are molded with the thermally non-conductive mold member 53. Therefore, a compact voltage regulator can be provided, and the reverse-current blocking diode 9 is thermally isolated from other elements of the control circuit that includes the switching element 11. The switching element 11 can be formed at a chip separated from the chip of the control circuit 8. Even if the switching element 11 is heated when passing the field current, the reverse-current blocking diode 9 is not heated, so that leak current of the reverse-current blocking diode 9 can be limited at a low level.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A voltage regulator of a vehicle AC generator having a field coil for charging a battery, said voltage regulator comprising:

a switching element connected between said battery and said field coil;

a control circuit for controlling said switching element according to terminal voltage of said battery;

a power circuit having a high-side input terminal, said power circuit providing a constant voltage from power supplied to said high-side terminal and supplying said control circuit with said constant voltage; and a reverse-current blocking diode having an anode connected through an outside power line to said battery and a cathode connected to said high-side terminal.

2. The voltage regulator as claimed in claim 1, wherein at least a portion of said control circuit, said power circuit and said reverse-current blocking diode are integrated into an IC chip and separated by insulation layers.

3. The voltage regulator as claimed in claim 1, wherein at least a portion of said control circuit and said power circuit are integrated into an IC chip and separated by insulation layers, and said reverse-current blocking diode is formed at a portion separate from said IC chip.

4. The voltage regulator as claimed in claim 3, wherein said IC chip and said portion at which said reverse-current blocking diode is formed are disposed in a hybrid IC unit.

5. The voltage regulator as claimed in claim 1, wherein said reverse-current blocking diode is fixed to a first conductive support plate and said power circuit is fixed to a second conductive support plate, and said first and second conductive support plates are thermally and electrically insulated from each other.

6. The voltage regulator as claimed in claim 5, wherein each of said first and second support plates comprises one of leads of a lead frame, said reverse-current blocking diode has a cathode electrode connected to said high-side said input terminal of said power circuit by a bonding wire, and said reverse-current blocking diode, said power circuit and said bonding wire are molded with resin.

7. The voltage regulator as claimed in claim 6, wherein each of said reverse-current blocking diode and said power circuit is separately fixed to one of said leads.

* * * * *